(12) United States Patent
Adams et al.

(10) Patent No.: US 6,859,467 B2
(45) Date of Patent: Feb. 22, 2005

(54) ELECTRO-OPTIC MODULATOR MATERIAL

(75) Inventors: John J. Adams, Livermore, CA (US); Chris A. Ebbers, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 4 days.

(21) Appl. No.: 10/137,140

(22) Filed: May 1, 2002

(65) Prior Publication Data

US 2002/0181514 A1 Dec. 5, 2002

Related U.S. Application Data

(60) Provisional application No. 60/288,703, filed on May 3, 2001.

(51) Int. Cl.[7] ................................................ H01S 3/115
(52) U.S. Cl. ............................. 372/12; 372/20; 372/39; 372/22; 372/10; 372/13; 372/41; 372/4
(58) Field of Search ................................ 372/4, 10, 12, 372/13, 20, 22, 39, 41

(56) References Cited

U.S. PATENT DOCUMENTS

| | | | |
|---|---|---|---|
| 3,914,018 A | | 10/1975 | DeShazer |
| 3,971,930 A | * | 7/1976 | Fitzmaurice et al. ........ 398/213 |
| 4,115,632 A | | 9/1978 | Kinoshita et al. |
| 4,207,297 A | | 6/1980 | Brown et al. |
| 4,866,372 A | * | 9/1989 | Aoshima et al. ............... 324/96 |
| 5,504,772 A | * | 4/1996 | Deacon et al. ............... 372/102 |
| 5,923,452 A | * | 7/1999 | Carlson ....................... 398/123 |
| 5,945,037 A | | 8/1999 | Ebbers |
| 6,185,231 B1 | | 2/2001 | Hammons et al. |
| 6,301,275 B2 | | 10/2001 | Eichenholz et al. |
| 6,304,354 B2 | * | 10/2001 | Carlson ....................... 398/129 |
| 6,327,282 B2 | | 12/2001 | Hammons et al. |
| 6,335,816 B1 | | 1/2002 | Luce |

OTHER PUBLICATIONS

Won Kweon Jang, Qing Ye, Dennis Hammons, Jason Eichenholz; Improved SHG by Selective Yb Ion Doping in a New Nonlinear Optical Crystal YCa4O(BO3)3. IEEE Journal Of Quantum Electronic, vol. 35, No. 12, Dec. 1999.□□.*

Richardson, M., et al., "YCOB Lasers," Journal of the Korean Physical Society, vol. 37, No. 5, Nov. 2000, pp. 633–639.

* cited by examiner

*Primary Examiner*—Minsun Oh Harvey
*Assistant Examiner*—Delma R. Flores Ruiz
(74) *Attorney, Agent, or Firm*—Eddie E. Scott; Alan H. Thompson

(57) ABSTRACT

An electro-optic device for use with a laser beam. A crystal has a first face and a second face. Means are provided for applying a voltage across the crystal to obtain a net phase retardation on the polarization of the laser beam when the laser beam is passed through the crystal. In one embodiment the crystal is composed of a compound having the chemical formula ReAe4O(BO3)3 where: RE consists of one or more of the following elements La, Ce, Pr, Nd, Sm, Eu, Gd, Tb, Dy, Ho, Er, Tm, Yb, Lu and two other elements Y and Sc; and where Ae is from the list of Ca, Sr, or Ba.

23 Claims, 5 Drawing Sheets

ELECTRO-OPTIC MODULATOR MATERIAL

CROSS-REFERENCE TO RELATED APPLICATIONS

This application claims the benefit of U.S. Provisional Application No. 60/288,703, filed May 3, 2001 titled "New Electro-optic Modulator Material." U.S. Provisional Application No. 60/288,703, filed May 3, 2001 titled "New Electro-optic Modulator Material" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to optical materials and more particularly to a crystal for electro-optic applications.

2. State of Technology

Background information is provided by U.S. Pat. No. 5,945,037 for an optical polarizer material patented to Christopher A. Ebbers, Aug. 31, 1999, which includes the following information, "An electromagnetic wave (such as light from a laser) is characterized by its direction of propagation, frequency, amplitude and polarization. The polarization corresponds to the direction parallel to the plane (and normal to the propagation direction) in which the amplitude of the wave rises and falls. A polarizer acts to alter this direction, either by absorption or reflection of light waves with the incorrect polarization. Light from an incoherent source such as a light bulb consists of many superimposed electromagnetic waves with random, relative polarizations. Passing this light through a polarizer allows only those light waves with the desired polarization to pass through. An example of a polarizer of the first type (absorption) is Polaroid film found in many sunglasses. Polarizers of the second type (reflection) are formed using thin film dielectric coatings, parallel wire grids (used for wavelengths typically > than 1 micrometer) and birefringent crystals (predominantly calcite ($CaCO_3$)). Polarization altering components such as waveplates are almost exclusively made from quartz ($SiO_2$). Lasers which are high peak power (large energy per pulse/pulse width) or high average power (large energy per pulse multiplied by the pulses per second) risk damaging the Polaroid or wire grid polarizers. Lasers such as these must use the thin film polarizers or calcite polarizers. Calcite polarizers are the "best" polarizers for a number of applications. The extinction ratio of a polarizer is a measure of how well that polarizer operates at to produce a specific polarization state of light. By placing together two similar polarizers with their polarization directions at right angles to each other, theoretically no light should be transmitted through those two polarizers. The ratio of the intensity of the measured transmitted light to the intensity of the incident light is known as the extinction ratio. Polaroid polarizers typically have an extinction ratio of 1:10,000. Thin film polarizers have typical extinction ratios of 1:1000. Calcite polarizers have the highest extinction ratios in the range of 1:100,000 to 1:1,000,000. Thin film polarizers are typically manufactured for a single wavelength, and thus are wavelength sensitive. Calcite polarizers have a higher extinction ratio, have a damage resistance as high as that of thin film polarizers, and are broadband. They are usable in the range of 2000 nm to 250 unm. Calcite is a naturally occurring mineral mined from the earth. The chemical formula is $CaCO_3$. The best calcite is mined in northern Mexico, where it was deposited by naturally occurring geothermal processes. However, most of the calcite mined is unsuitable for optical use, due to veils, inclusions, and other crystalline defects. Also, although the theoretical transmission of calcite extends roughly from 200 nm to 4000 nm, the practical absorption in the far infrared and near ultraviolet (in the mined crystal) is limited by the ionic impurities (such as Fe) which were present in the water in which the calcite grew. These problems inherent in mined calcite would be reduced by synthetic growth methods. Unfortunately, if calcite is directly heated at atmospheric pressure, it decomposes to CaO and $CO_2$ before it melts. (This is true of most carbonates.) To grow calcite, it is necessary to duplicate the high pressure and temperature found in the earth. This entails growing calcite by a hydrothermal method. While hydrothermal methods are used extensively to grow quartz in industrial quantities, only experimental quantities of synthetically grown calcite are available. Industrial hydrothermal growth methods are much more expensive than low temperature melt growth methods, and calcite can not be grown by the standard low temperature melt growth methods. In addition, calcite grown using industrial hydrothermal methods contains microinclusions of water, degrading its performance in the infrared wavelength regime (due to optical absorption by the water inclusions) as well as in the ultraviolet spectral regime (due to scattering by the submicron water inclusions. Calcite remains, after more than a century, the principal material for Nicol prisms in the polarizing microscope. As natural stocks are depleted the need for growing synthetic $CaCO_3$ in large 1–2" minimum size boules becomes more urgent. Thus, a need exists for a replacement material for calcite as a polarization material."

Background information is provided by U.S. Pat. No. 6,185,231, patented Feb. 6, 2001, and U.S. Pat. No. 6,327,282, patented Dec. 4, 2001, for a Yb-doped:YCOB laser to Dennis A. Hammons which include the following information, "A tunable, solid state laser device with both visible and infrared laser emission is developed with a trivalent ytterbium-doped yttrium calcium oxyborate crystal as the host crystal. The Yb:YCOB crystal generates an infrared fundamental light over a wide bandwidth, from approximately 980 nanometers (nm) to approximately 1100 nm. The bandwidth generated by the Yb:YCOB crystal is approximately 100 nm wide and supports the generation of pulsed infrared light or when self-frequency doubled provides a compact, efficient, source of tunable, visible, blue or green laser light in wavelengths of approximately 490 nm to approximately 550 nm."

Background information is provided by U.S. Pat. No. 6,330,097 to Qiushui Chen, et al. for a high-speed electro-optic modulator, patented Dec. 11, 2001 which includes the following information, "Much progress has been made in the last thirty years in developing optical switches or modulators, but current devices are not very satisfactory for many applications. The majority of active fiberoptic devices used in present day systems, for example, fiberoptic intensity attenuators, are based on electromechanical operation. In one type, fibers are positioned end to end and mechanically moved in or out of line. In another type, mirrors are rotated to direct beams into or away from a receiving fiber. This can be accomplished mechanically or with piezoelectric or electrostatic drivers. Mechanical devices intrinsically lack speed and long term reliability. Solid-state light controlling devices (without moving parts) are needed for fiber communication systems. A key problem for these developing fiberoptic components is realizing speed and reliability, as well as the essential fiberoptic systems requirement of low insertion loss and polarization insensitivity. For devices used between regular fibers, low insertion loss and polarization insensitivity operation is the basic performance requirement. Others have proposed an optical switch/attenuator using a liquid crystal cell as the modulation element situated between an input and an output birefringent element, each fed by optical fibers. When the liquid crystal cell is turned on, light emerging from the output birefringent element is deflected and not focused by the subsequent collimator onto the corresponding optical fiber. Although it has the desirable features of low insertion loss, and low required operating voltage, being liquid crystal-based, the long term reliability of organic materials and the relatively low switching speed are not suitable for many applications. Others have also proposed a fast (less than one microsecond) optical switch using an electro-optic crystal in which birefringence can be induced by application of an electric field. Operation is based on rotating the plane of polarization of light with respect to the orientation of a subsequent passive polarizer that blocks or transmits light depending on the angle. The basic arrangement works efficiently with incoming light polarized with a particular orientation. Randomly polarized light suffers a loss. This is overcome by using additional elements that split incoming light into two orthogonal polarizations, passively rotates one to match the other, and combines the two into a single beam fed to the basic modulator. However, the suggested electro-optic crystals, require voltages of a kV or more for operation. Still others have described a modulator having a tapered plate, a Faraday rotator or electro-optic crystal, and a second tapered plate. The Faraday rotator is controlled by varying the current in an external coil which varies a magnetic field. The suggested electro-optic crystals require high drive voltages of kilovolts. Electrode design also effects polarization dependence and modulation efficiency."

Background information is provided by U.S. Pat. No. 6,335,816 for Pockels cell and optical switch with pockels cell to Jacques Luce, patented Jan. 1, 2002 which includes the following information, "By Pockels cell is meant an electro-optical cell able to change the polarisation of a beam crossing through it via the application of an electric field to the cell. Said cell may be cut in birefractive crystal whose cristallographic axes are deviated by the presence of an electric field parallel to the optical axis of the crystal. This warrants the name 'Pockels cell' with longitudinal field. Regenerative amplifiers use a trigger switch in two states. In a first state, photons are trapped and amplified in a laser cavity, while in the second state the photons are removed from the cavity. To achieve the switch function, systems are used with which the polarisation of the laser beam can be switched by 90° by means of return excursion in a Pockels cell controlled by an electric voltage. Conventionally a KDP (potassium-dihydrogen-phosphate) crystal bar is used having a length of 2 to 3 cm, whose ends are provided with electrodes. To carry out optical switching in two states, it is necessary to successively apply two independent voltages of high potential (for example 4000 V) to each electrode in order to set up or cancel a polarising electric field in the cell. The quick changeover from one voltage to the other requires costly and complex electronic switching equipment. It proves to be difficult to provide electronic switching equipment which achieves both fast set-up of a high voltage on a terminal and fast cancellation of this voltage. To avoid this difficulty, the single Pockels cell switch is replaced by a switch with two Pockels cells."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a crystal for electro-optic applications. In one embodiment the crystal is composed of a compound having the chemical formula $ReAe_4O(BO_3)_3$ where: RE consists of one or more of the following elements La, Ce, Pr, Nd, Sm, Eu, Gd, Tb, Dy, Ho, Er, Tm, Yb, Lu and two other elements Y and Sc; and where Ae is from the list of Ca, Sr, or Ba. In one embodiment the two other elements Y and Sc behave similar to rare earths. In one embodiment the sum of the partial substitution of the combination of said Ca, Sr, or Ba sums to 4. One embodiment of the present invention provides an electro-optic device for use with a laser beam. The electro-optic device includes a yttrium calcium oxyborate ($YCa_4O(BO_3)_3$ or YCOB) crystal that has a first face and a second face. Means are provided for applying a voltage across the crystal to obtain a net phase retardation on the polarization of a laser beam when the laser beam is passed through the crystal. In another embodiment, the crystal is composed of a compound having the chemical formula $ReAe_4O(BO_3)_3$ where: RE consists of one or more of the following elements La, Ce, Pr, Nd, Sm, Eu, Gd, Tb, Dy, Ho, Er, Tm, Yb, Lu and two other elements Y and Sc. In another embodiment the crystal is composed of a compound having the chemical formula $ReAe_4O(BO_3)_3$ where: RE consists of one or more of the following elements La, Ce, Pr, Nd, Sm, Eu, Gd, Tb, Dy, Ho, Er, Tm, Yb, Lu and two other elements Y and Sc; and where Ae is from the list of Ca, Sr, or Ba. In another embodiment the two other elements Y and Sc behave similar to rare earths. In another embodiment, the sum of the partial substitution of the combination of said Ca, Sr, or Ba sums to 4.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above and the detailed description of the specific embodiments, serve to explain the principles of the invention.

DETAILED DESCRIPTION OF THE INVENTION

Figure 1:
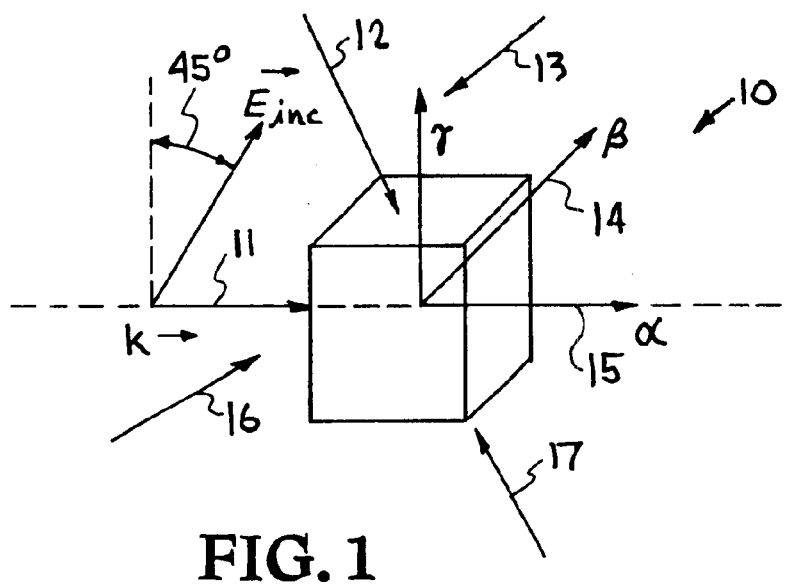
FIG. 1 illustrates a transverse electrode YCOB electro-optic configuration (composed of YCOB, LaCOB, GdCOB, LuCOB, or ScCOB, or mixed crystal).

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Electro-optic switches, also known as Pockels cells or Q-switches, are common optical elements associated with high power lasers. Electro-optic switches are used to control the polarization state of the laser beam either externally to the laser cavity or internal to the laser cavity. Four commercially available materials, [KD2PO4 (DKDP or KD*P) or BaB2O4 (BBO) or KTiOPO4 (KTP) or LiNbO3 (lithium niobate)], are used in the construction of electro-optic Q-switches or Pockels cells (See Table 1 below). Each of these crystals suffer from specific limitations. KTP suffers from high electrical conductivity and optical homogeneity problems. Lithium niobate has a low surface damage threshold. KD*P has limits to its usefulness in high average power applications. BBO is difficult to grow and polish. Nevertheless, in spite of these issues, each of the materials has found commercial application.

TABLE 1

The half-wave voltage of several commonly used electro-optic crystals at a wavelength of 1.064 micron for equivalent electrode and propagation thickness.

| Crystal | Longitudinal/Trans-verse | Half-wave Voltage (kV) |
| --- | --- | --- |
| LiNbO3 | Transverse | 15.5 kV |
| KD2PO4 (KD*P) | Longitudinal | 7.2 kV |
| KD2PO4 (KD*P) | Transverse | 13.4 kV |
| KTiOPO4 (KTP) | Transverse | 6.2 kV |
| BaB2O4 (BBO) | Transverse | 56 kV |
| YCa4O(BO3)3 (YCOB) I | Transverse I | 98 kV |

Each of the crystals mentioned in Table 1 has specific advantages and limitations. For example, KTP has the largest effective electro-optic coefficient, has good thermal properties and is easily polished and coated. However, the optical homogeneity of KTP limits the availability of even moderate aperture crystals. Lithium niobate is also limited by optical homogeneity issues as well as a low surface damage threshold. KD*P has issues regarding the optical coating of the crystal and the capability of the crystal at even moderate average powers. It is these issues that have enabled the use of BBO, which has a relative small effective electro-optic coefficient, leading to a relatively high half-wave voltage. BBO is also a difficult crystal to grow in large sizes, and is difficult to polish and optically coat. Yttrium calcium oxyborate, (YCa4O(BO3)3 or YCOB) is a new crystal currently used for second harmonic generation applications. YCOB is structurally related to a series of crystals, where, for example, the element yttrium may be substituted for lanthanum, gadolinium, etc. forming a structurally similar compound such as gadolinium calcium oxyborate (GdCa4O(BO3)3 or GdCOB). YCOB, GdCOB, and the other isostructurally similar compounds are relatively easy to grow large volume crystals, are relatively easy to optically polish, and are relatively easy crystals to optically coat. In addition, unlike crystals such as BBO or KD*P, it is also possible to mechanically bond two crystals of YCOB either through a method such as diffusion bonding or utilizing an optical glue similar to sodium silicate (waterglass). YCOB and the structurally related crystals may also be used as electro-optic switches. The effective electro-optic coefficient of YCOB is similar to that of BBO (YCOB electro-optic crystals need to be 2.1 times longer than an equivalent BBO crystal in order to achieve the same half-wave voltage—since YCOB is easy to grow, this increase in propagation length is not an issue). Thus, the most probable use of YCOB is as an alternative electro-optic crystal to BBO.

Typically, Pockels cells are used to control the switching of laser light into or out of a laser cavity (i.e., Q-switched lasers, regenerative amplifiers, power oscillators, etc.), or to control the polarization state of light external to a laser cavity. A Pockels cell basically allows manipulation of the laser beam polarization, controlled by the voltage applied to the electro-optic crystal, which then interacts with a polarizer, controlling the irradiance of the transmitted or reflected laser light. Again, the polarization of the light is manipulated through application of an electrical voltage to the electro-optic crystal. The magnitude of this effect is determined by the electro-optic coefficient of the crystal—an intrinsic property of the crystal. While there are many crystals with non-zero electro-optic coefficients, there are few crystals with coefficients sufficiently large to be useful which have properties such as ease of growth, ease of fabrication, long term stability, ease of optical coating, good thermal properties, etc. That is, there is an entire set of properties, other than the size of the electro-optic coefficient, which allow a crystal to be commercially viable as an electro-optic device. The crystals used in commercially available Q-switches tend to be lithium niobate (LiNbO3), potassium dihydrogen phosphate (KDP), potassium dideuterium phosphate (KD*P), beta-barium borate (BBO), potassium titanyl phosphate (KTP), potassium titanyl arsenate (KTA), or rubidium titanyl arsenate (RTA).

Applicants have discovered that the properties of YCOB and the isostructural crystals have utility as a replacement for BBO or other commercially available Q-switches. YCOB has electro-optic coefficients of similar magnitude to those of BBO, but YCOB is easier to grow, polish, optically bond, and coat as compared to BBO, making it an easier crystal with which to fabricate electro-optic devices.

One important property of the electro-optic crystal is the 'half-wave' voltage. The half-wave voltage is the applied voltage needed to induce a retardation of one-half a wavelength, which corresponds to the applied voltage that will rotate the polarization of the incident light by 90 degrees. The half-wave voltage is given by the formula $$V_{pi}=(d/L)*\lambda/r_{eff}$$

where Vpi is the applied voltage that induces a retardation of pi. The half-wave voltage is usually expressed in kilovolts, d is the distance between the electrodes across which the voltage is applied, L is the thickness through which the light propagates, λ is the wavelength of the light, and reff is the effective electro-optic coefficient.

From the above equation, Applicants find that the half-wave voltage is smaller for shorter wavelengths, larger effective electro-optic coefficients, or aspect ratios such that the light propagates through a distance longer than over which the electric field is applied.

There are two classes of electro-optic devices, longitudinal and transverse. A longitudinal device has the light propagation collinear with the applied electric field. In this case the propagation distance (L) and the distance across which the electric field is applied (d) are identical. In a transverse electrode case, the electric field is in a different direction from which the light propagates. Whether or not a crystal can be utilized in a longitudinal configuration is dependent upon the specific crystal.

Applicants will now describe a number of embodiments of the present invention wherein a YCOB crystal has a first face and a second face. The first face and the second face are substantially parallel. Means are provided for applying a voltage across the YCOB crystal. This obtains a net phase retardation on the polarization of a laser beam when the laser beam is passed through the YCOB crystal. Some of the embodiments include placing YCOB crystals between parallel metal plates for the transverse cases or coating parallel faces of the crystals with transparent electrodes and, by applying a voltage across the crystals, obtaining a net phase retardation on the polarization of a laser beam passing through the crystals. The voltage across the crystals can be applied with standard high-voltage power supplies or pulsers.

Referring now to the drawings, embodiments of the invention including different configurations for the YCOB crystals, the laser beam propagation direction, the laser beam polarization, and the applied DC electric field (voltage) are illustrated in FIGS. 1 through 8. Several conventions are used in the attached FIGS. 1 through 8 as described below.

1. The dielectric axes directions are shown for the crystals and are labeled using Greek letters (α,β,γ). These axes are called the principal dielectric axes and define an orthonormal coordinate system. The α dielectric axis is that axis that when light is propagated down either the β or γ dielectric axes with a polarization direction parallel to the α axis, the refractive index nα would be observed. Likewise, the β dielectric axis is that axis that when light propagates down either the α or γ dielectric axes with a polarization direction parallel to the β axis, the refractive index nβ would be observed. Finally, the γ dielectric axis is that axis that when light propagates down either the α or β dielectric axes with a polarization direction parallel to the γ axis, the refractive index nγ would be observed. The relation between the principal refractive indices (nα,nβ,nγ) is chosen such that nα labels the smallest principal refractive index and nγ labels the largest refractive index where nα<nβ<nγ. The coordinate system defined by the dielectric axes (α,β,γ) is equivalent to the (x,y,z) coordinate system used by other research groups (i.e. nx, ny, and nz are equivalent to nα, nβ, and, nγ, respectively).

2. EDC points in the direction of the applied DC voltage.

3. The laser beam propagates from left to right as shown by the k-vector in the figures.

4. The input laser beam polarization is at 45 degrees to the vertical perpendicular to the plane of the paper in the figures.

5. The crystal faces across which the DC voltage is applied are gold coated for transverse propagation (or another electrically conductive material is put in contact with the appropriate crystal faces) or are coated with an electrically conductive transparent electrode material (such as ITO) for longitudinal propagation. (As is commonly done by those skilled in the art, electrodes with holes allowing propagation of light through the holes or ring electrodes pairs are utilized for longitudinal cases.)

Applicants have built and tested working prototypes of various embodiments and experimentally determined the effective electro-optic coefficients of several configurations. Values for the effective electro-optic coefficients were found to be 10.81 pm/V, 0.82 pm/V, 15.1 pm/V, and 3.4 pm/V which implies half-wave (Vpi) switching voltages of 98 kV, 1.3 MV, 71 kV, and 313 kV, respectively, for crystals where the distance through which light propagates (1) and the distance across which the voltage is applied (d) is equal (i.e. d=1).

The configurations shown with two crystals and two crystals and a rotator can also be made more compact by diffusion bonding the parts longitudinally in the figures eliminating the air gaps between faces of adjacent parts. The YCOB crystals shown in the figures could be replaced by any member of the YCOB family of crystals, namely, GdCOB, LaCOB, Gd,YCOB, Gd,LaCOB, and Y,LaCOB.

Referring now to FIG. 1, a transverse electrode YCOB electro-optic modulator (composed of YCOB, LaCOB, GdCOB, LuCOB, or ScCOB, or mixed crystal) is illustrated. The YCOB electro-optic crystal is generally referred to as a "piece" and is designated by the reference numeral 10. Linear (or circularly) polarized light (11) with polarization axis 45 degrees to the γ (13) and β (14) dielectric axes enters piece 10. An electric field is applied parallel to the γ dielectric axis, altering the polarization state of the light passing through the crystal. For the applied electric field, Edc, it is assumed that this implies a static electric field or a low frequency (frequency<1 GHz) electric field. Either the propagation length of the crystal is controlled or the temperature of the crystal is controlled such that for the particular wavelength of light, the natural birefringence of the crystal, with no voltage applied, produces a desired polarization state (usually the same polarization state as the incident light).

Figure 2:
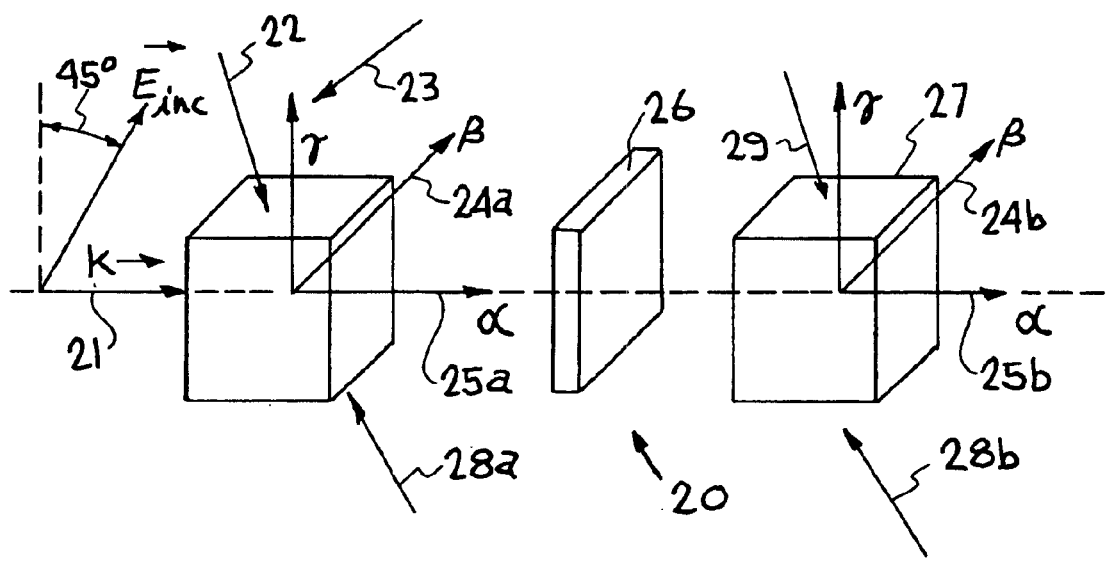
FIG. 2 is a configuration similar to the electro-optic configuration illustrated in FIG. 1, except that a 90-degree rotator (26) and second, identical crystal (27) follows the first crystal.

Referring now to FIG. 2, another embodiment of the present invention is illustrated. A YCOB electro-optic modulator system is shown and is generally designated by the reference numeral 20. This configuration is essentially the same as FIG. 1 except that two crystals, of similar cut as FIG. 1 are utilized. In addition, a third optical element (26) a 90-degree rotator for the particular wavelength of light utilized is introduced in between the two crystals. Linear (or circularly) polarized light (21) with polarization axis 45 degrees to the γ (23) and β (24) dielectric axes enters the first crystal. An electric field is applied parallel to the γ dielectric axis, applied to the YCOB crystal faces 22 and 28a, as well as YCOB crystal faces 29 and 28b. For this particular configuration, the polarity of the electric field on crystal 1 may be identical or opposite to the electric field applied to the second crystal. For the applied electric field, Edc, it is assumed that this implies a static electric field or a low frequency (frequency<1 GHz) electric field. The system (20)

illustrated in FIG. 2 is a configuration similar to the electro-optic configuration illustrated in FIG. 1, except that a 90-degree rotator (26) and a second, identical crystal (27) follows the first crystal. The light passes through the first crystal, the 90-degree rotator (26), and the second crystal (27). Again, the polarization state of the light exiting the system through the exit window is controlled by application of the electric field Edc. The 90-degree rotator (26) and the second crystal (27) eliminate the need for temperature control of the crystals.

Applicants will now describe another embodiment of the present invention similar to the system illustrated in FIG. 2. This embodiment has all three optical elements optically bonded to each other, either through optical contacting, use of thermally assisted bonding (diffusion bonding such as performed by Onyx optics), or use of a type of surface bonding enabled by some type of material similar to 'waterglass', or other optical cement, or equivalent. The feature of bonding is that the individual optical surfaces are eliminated.

Applicants will now describe yet another embodiment of the present invention similar to the system illustrated in FIG. 2. This embodiment eliminates the 90-degree rotator. The second crystal is physically rotated 90 degrees (about the light propagation direction) with respect to the first crystal. Again, both crystals are identical with respect to length.

Applicants will now describe yet another embodiment of the present invention similar to the system illustrated in FIG. 2. This embodiment with the second crystal rotated 90 degrees (about the light propagation direction) eliminates the 90-degree rotator. The two crystals are either optically contacted, thermally bonded (diffusion bonded), or bonded together with an optical cement or an optical glue. The advantage is that now there are only two crystals, again temperature control is not needed, and there are only two optical surfaces exposed to air.

Figure 3:
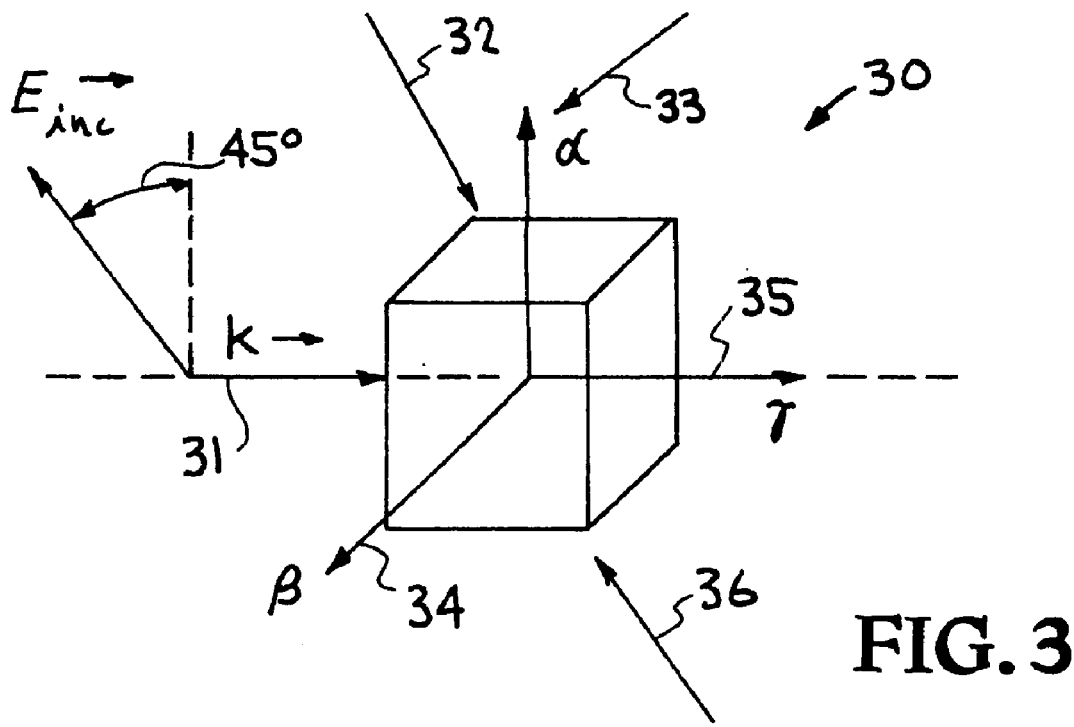
FIG. 3 illustrates a crystal orientation with a relatively high half-wave voltage.

Referring now to FIG. 3, a crystal orientation with a relatively high half-wave voltage is illustrated. The crystal is generally designated by the reference numeral 30. Linear (or circularly) polarized light 31 with polarization axis 45 degrees to the α (33) and β (34) dielectric axes enters piece 30. An electric field is applied parallel to the α dielectric axis, altering the polarization state of the light passing through the crystal. This electric field, Edc, is applied to crystal faces 32 and 36. For the applied electric field, Edc, it is assumed that this implies a static electric field or a low frequency (frequency<1 GHz) electric field. Either the propagation length of the crystal is controlled or the temperature of the crystal is controlled such that for the particular wavelength of light, the natural birefringence of the crystal, with no voltage applied, produces a desired polarization state (usually the same polarization state as the incident light). Again, the polarization state of the light exiting the crystal is controlled by application of the electric field Edc.

Figure 4:
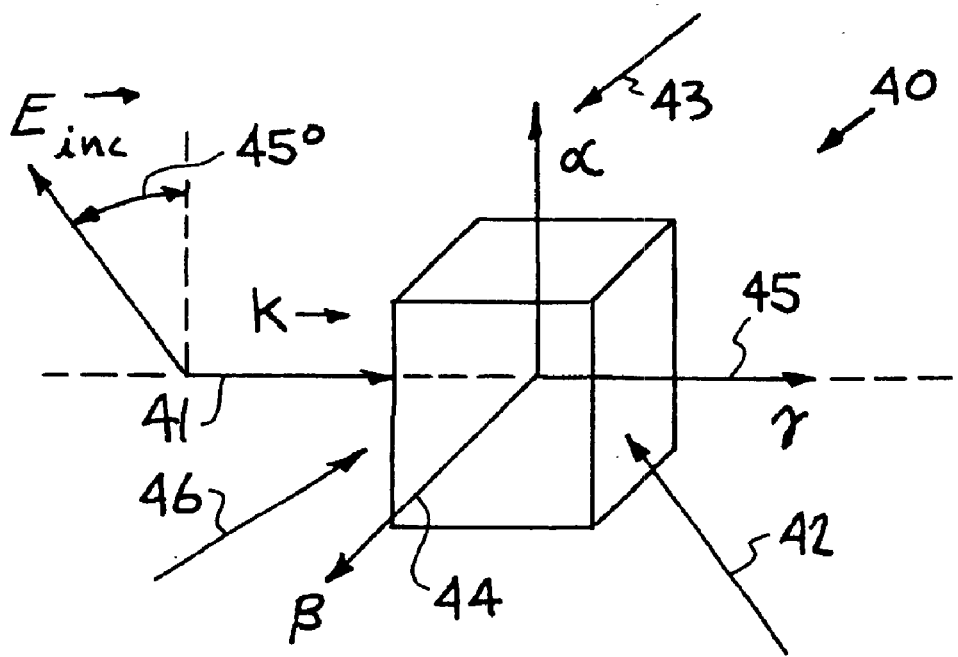
FIG. 4 illustrates a YCOB crystal in a longitudinal electro-optic configuration.

Referring now to FIG. 4, a YCOB crystal in a longitudinal electro-optic configuration is illustrated. The YCOB crystal is generally designated by the reference numeral 40. Linear (or circularly) polarized light 41 with polarization axis 45 degrees to the α (43) and β (44) dielectric axes enters piece 40. An electric field is applied parallel to the γ dielectric axis, altering the polarization state of the light passing through the crystal. The applied electric field, Edc, is parallel to the light propagation direction. This electric field, Edc, is applied to crystal faces 46 and 42. For the applied electric field, Edc, it is assumed that this implies a static electric field or a low frequency (frequency<1 GHz) electric field. Again, the polarization state of the light exiting the crystal is controlled by application of the electric field Edc. Either the propagation length of the crystal is controlled or the temperature of the crystal is controlled such that for the particular wavelength of light, the natural birefringence of the crystal, with no voltage applied, produces a desired polarization state (usually the same polarization state as the incident light). This configuration is an example of a Pockels cell device scaleable to large apertures, similar to the plasma-electrode Pockels cell.

Figure 5:
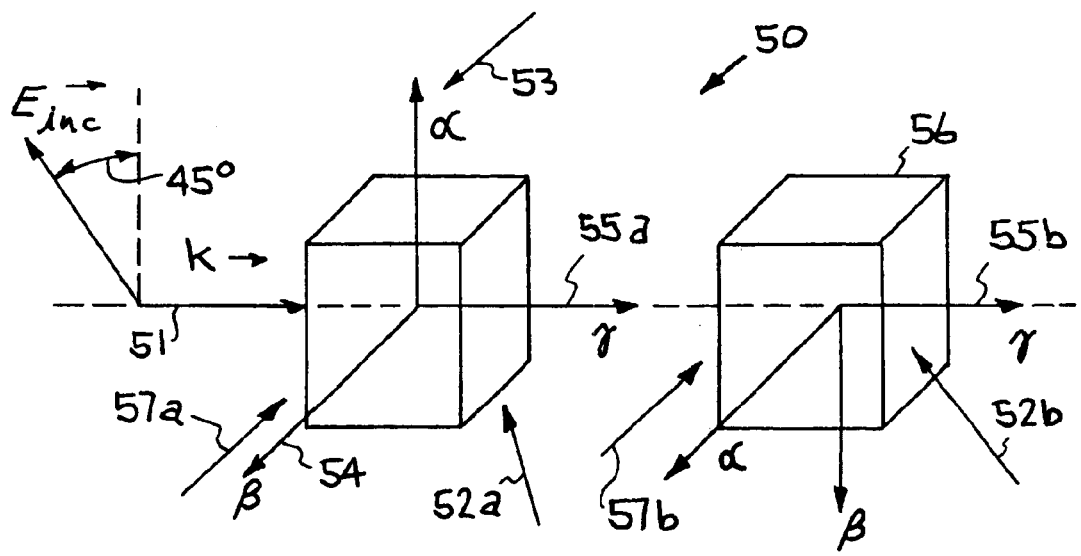
FIG. 5 illustrates two YCOB crystals in a longitudinal electro-optic configuration.

Referring now to FIG. 5, a crystal in a longitudinal electro-optic configuration is illustrated. The crystal is generally designated by the reference numeral 50. Linear (or circularly) polarized light 51 with polarization axis 45 degrees to the α (53) and β (54) dielectric axes enters the first crystal. An electric field is applied parallel to the γ dielectric axis, altering the polarization state of the light passing through the crystal. The applied electric field, Edc, is parallel to the light propagation direction. This electric field, Edc, is applied to crystal faces 57a and 52a. In addition, this electric field is also applied to 57b and 52b. The polarity of the electric field applied to the first crystal 53 may be similar or opposite to the field applied to the second crystal. (For example, when a positive field is applied to 57a relative to 52a, a positive electric field might also be applied to 57b relative to 52b). For the applied electric field, Edc, it is assumed that this implies a static electric field or a low frequency (frequency<1 GHz) electric field. Again, the polarization state of the light exiting the device (50) is controlled by application of the electric field Edc. The embodiment of the present invention illustrated in FIG. 5 is similar to the system illustrated in FIG. 4; however, this device is no longer temperature controlled, since the second crystal 56, which is optically matched to the first crystal, eliminates the need for very precise temperature control.

Applicants will now describe yet another embodiment of the present invention similar to the system illustrated in FIG. 5. This embodiment eliminates the individually separate crystals. The two crystals are either optically contacted, thermally bonded (diffusion bonded), or bonded together with an optical cement or an optical glue. The advantage is that now there are only two crystals, again temperature control is not needed, and there are only two optical surfaces exposed to air. The crystals are contacted in a relative state of orientation such that an electric field, Edc is applied to face 57a and the opposite polarity is applied to crystal face 52b.

Figure 6:
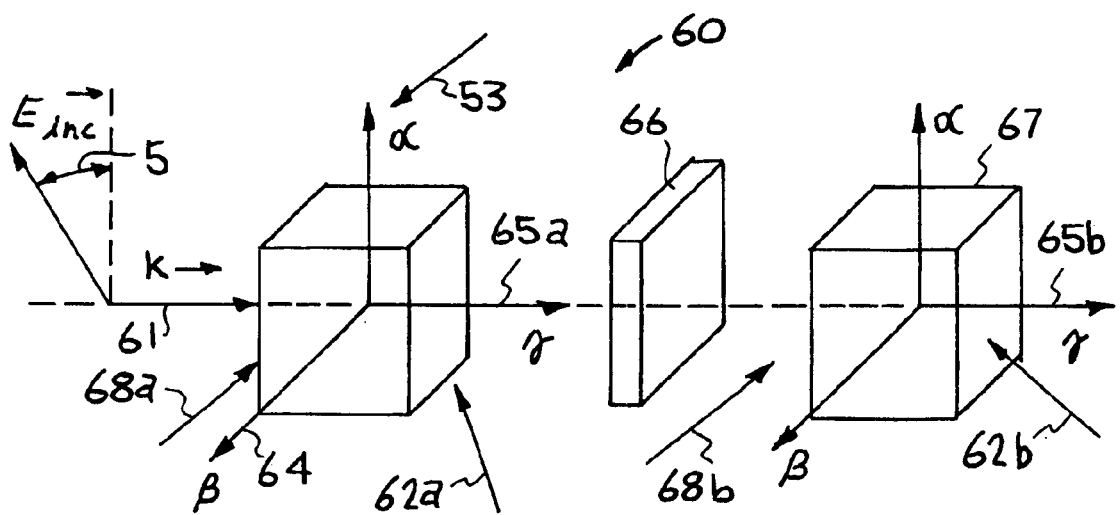
FIG. 6 illustrates another pair of crystals in a longitudinal electro-optic configuration.

Referring now to FIG. 6, a crystal in a longitudinal electro-optic configuration is illustrated. The crystal is generally designated by the reference numeral 60. Linear (or circularly) polarized light 61 with polarization axis 45 degrees to the α (53) and β (64) dielectric axes enters the first crystal. An electric field is applied parallel to the γ dielectric axis, altering the polarization state of the light passing through the crystal. The applied electric field, Edc, is parallel to the light propagation direction. This electric field, Edc, is applied to crystal faces 68a and 62a. In addition, this electric field is also applied to 68b and 62b. The polarity of the electric field applied to the first crystal may be similar or opposite to the field applied to the second crystal. (For example, when a positive field is applied to 68a relative to 62a, a positive electric field might also be applied to 68b relative to 62b). For the applied electric field, Edc, it is assumed that this implies a static electric field or a low frequency (frequency<1 GHz) electric field. Again, the polarization state of the light exiting the device (60) is controlled by application of the electric field Edc. The embodiment of the present invention illustrated in FIG. 6 is similar to the system illustrated in FIG. 5; except that a 90-degree rotator (66) has been added.

Figure 7:
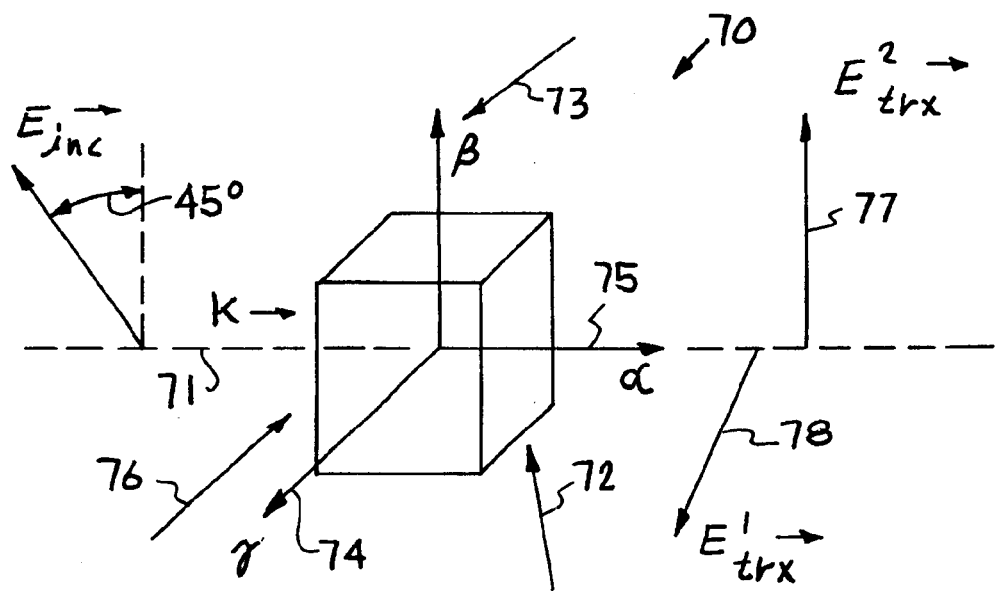
FIG. 7 illustrates another embodiment of an electro-optic device utilizing YCOB or a similar crystal.

Referring now to FIG. 7, yet another implementation of an electro-optic device utilizing YCOB or similar crystal is illustrated. The crystal is generally designated by the reference numeral 70. Linear (or circularly) polarized light 71 with polarization axis 45 degrees to the $\beta$ (73) and $\gamma$ (74) dielectric axes enters the first crystal. An electric field is applied parallel to the $\alpha$ dielectric axis, altering the polarization state of the light passing through the crystal. The applied electric field, Edc, is parallel to the light propagation direction. This electric field, Edc, is applied to crystal faces 76 and 72. For the applied electric field, Edc, it is assumed that this implies a static electric field or a low frequency (frequency<1 GHz) electric field. Again, the polarization state of the light exiting the crystal (70) is controlled by application of the electric field Edc.

Figure 8:
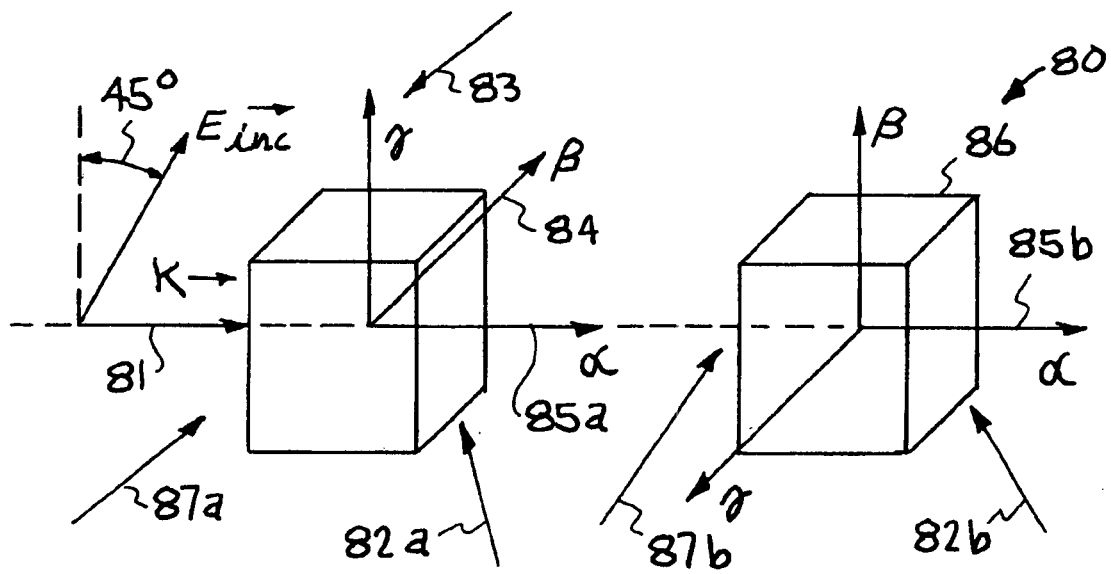
FIG. 8 illustrates yet another embodiment of an electro-optic device utilizing YCOB or a similar crystal.

Referring now to FIG. 8, yet another implementation of an electro-optic device utilizing YCOB or similar crystal is illustrated. The crystal is generally designated by the reference numeral 80. Linear (or circularly) polarized light 81 with polarization axis 45 degrees to the $\beta$ (84) and $\gamma$ (83) dielectric axes enters the first crystal. An electric field is applied parallel to the $\alpha$ dielectric axis, altering the polarization state of the light passing through the crystal. The applied electric field, Edc, is parallel to the light propagation direction. This electric field, Edc, is applied to crystal faces 87a and 82a. In addition, this electric field is also applied to 87b and 82b. The polarity of the electric field applied to the first crystal may be similar or opposite to the field applied to the second crystal (86). For example, when a positive field is applied to 87a relative to 82a, a positive electric field might also be applied to 87b relative to 82b). For the applied electric field, Edc, it is assumed that this implies a static electric field or a low frequency (frequency<1 GHz) electric field. Again, the polarization state of the light exiting the system (80) is controlled by application of the electric field Edc. The embodiment of the present invention illustrated in FIG. 8 is similar to the system illustrated in FIG. 7; however, this device is no longer temperature controlled, since the second crystal 86, which is optically matched to the first crystal, eliminates the need for very precise temperature control.

The present invention provides a crystal for electro-optic applications such as phase modulation or amplitude modulation of light, and as a Q-switch. The crystal is of the type yttrium calcium oxyborate and the related isostructural (similar structure) crystals (i.e., gadolinium calcium oxyborate or GdCOB, lanthanum calcium oxyborate or LaCOB or crystals of the general type ReAe40(BO3)3 where: RE consists of one or more of the following elements La, Ce, Pr, Nd, Sm, Eu, Gd, Tb, Dy, Ho, Er, Tm, Yb, Lu (also known as the rare earths) and two other elements Y and Sc which behave similar to rare earths; where Ae is from the list of Ca, Sr, or Ba (also known as alkaline earths) and the sum of the partial substitution of the combination of these elements sums to 4. One embodiment of the present invention is the use of yttrium calcium oxyborate (YCa40(BO3)3 or YCOB) as an intracavity electro-optic Q-switch, replacing the use of deuterated KD2P04 (DKDP or KD*P) of BaB204 (BBO) or KTiOP04 (KTP) or LiNbO3(lithium niobate) for this application.

Applicants have discovered that the properties of YCOB and the isostructural materials listed above, have utility as a replacement for BBO or other commercially available electro-optic crystals. In particular, YCOB has electro-optic coefficients of similar magnitude as BBO, but YCOB is easier to grow, polish, and coat compared to BBO, making it easier to fabricate electro-optic devices.

Uses of the present invention include: The YCOB electro-optic modulator has use for electro-optic switching applications such as a Q-switch, pulse slicer, or electro-optic modulator for 1064 nm lasers (Nd:YAG), 1053 nm lasers (Nd:phosphate glass and Nd:YLF), 1047 nm lasers (Nd:YLF and Yb:S-FAP), and 1030 nm lasers (YbAG and Yb:YAG), KrF lasers (248 nm), XeCI lasers (308 nm) or other lasers or light sources with a wavelength between 200 and 2500 nm. Other uses include using the YCOB electro-optic modulator as a replacement for BBO or KDP in electro-optic Q-switched lasers.

Figure 9:
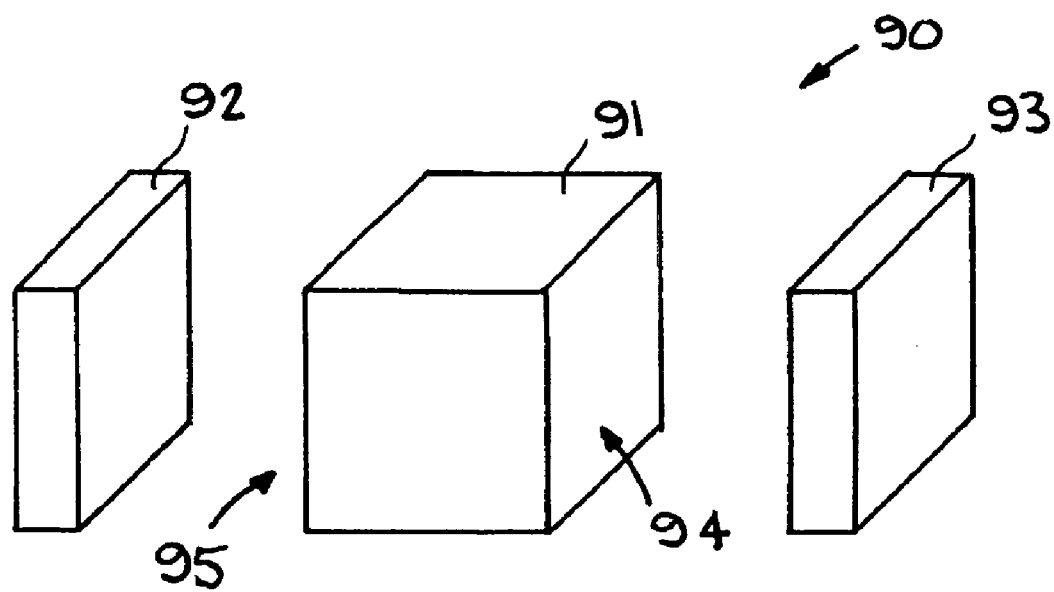
FIG. 9 illustrates a system for applying a voltage across the YCOB crystal.

Referring now to FIG. 9, an embodiment of a system for applying a voltage across the YCOB crystal is illustrated. The system is designated by the reference numeral 90. The system 90 obtains a net phase retardation on the polarization of a laser beam when the laser beam is passed through a YCOB crystal 91. The YCOB crystal 91 is placed between parallel metal plates 92 and 93 for the longitudinal cases. The crystal 91 has a first face 95 and a second face 94. By applying a voltage across the crystal 91 a net phase retardation on the polarization of a laser beam passing through the crystal 91 is obtained. The voltage across the crystal 91 can be applied with standard high-voltage power supplies or pulsers. Instead of using metal plates, the voltage across crystal 91 can be applied by coating parallel faces 94 and 95 of the crystal with transparent electrodes. The faces do not need to be parallel. As shown in FIGS. 1–8, the details for the different configurations for the YCOB crystals, the laser beam propagation direction, the laser beam polarization direction, and the applied DC electric field (voltage) are shown.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An electro-optic apparatus that will obtain a net phase retardation on the polarization of a laser beam for controlling the switching of the laser beam, comprising:

a crystal with electro-optic characteristics for controlling the switching of the laser beam, said crystal having a first connection face and a second connection face, said first connection face and said second connection face being generally parallel, said crystal composed of a compound having the chemical formula ReAe40(BO3)3 where: RE consists of one or more of the following elements La, Ce, Pr, Nd, Sm, Eu, Gd, Tb, Dy, Ho, Er, Tm, Yb, Lu and two other elements Y and Sc; and where Ae is from the list of Ca, Sr, or Ba; and means for applying a voltage across said crystal from said first connection face to said second connection face utilizing said electro-optic characteristics to obtain a net phase retardation on the polarization of the laser beam when the laser beam is passed through said crystal for controlling the switching of the laser beam.

2. The electro-optic apparatus of claim 1 wherein said two other elements Y and Sc behave similar to rare earths.

3. The electro-optic apparatus of claim 2 wherein the sum of the partial substitution of the combination of said Ca, Sr, or Ba sums to 4.

4. The electro-optic apparatus of claim 1, wherein said crystal is a crystal of the type yttrium calcium oxyborate and the related isostructural such as gadolinium calcium oxyborate or GdCOB, lanthanum calcium oxyborate or LaCOB or crystals of the general type ReAe4O(BO3)3 where: RE consists of one or more of the following elements La, Ce, Pr, Nd, Sm, Eu, Gd, Tb, Dy, Ho, Er, Tm, Yb, Lu and two other elements Y and Sc which behave similar to rare earths; where Ae is from the list of Ca, Sr, or Ba and the sum of the partial substitution of the combination of these elements sums to 4.

5. The electro-optic apparatus of claim 1, wherein said crystal is yttrium calcium oxyborate YCa4O(BO3)3.

6. The electro-optic appparatus of claim 1, wherein said means for applying a voltage across said crystal from said first connection face to said second connection face utilizes a standard high-voltage power supply.

7. The electro-optic apparatus of claim 1, wherein said means for applying a voltage across said crystal from said first connection face to said connection face utilizes a pulsed high voltage power supply.

8. The electro-optic apparatus of claim 1, including a first electrode operatively connected to said first connection face, a second electrode operatively connected to said second connection face, and wherein said means for applying a voltage across said crystal utilizes a standard high-voltage power supply operatively connected to said first electrode and said second electrode.

9. The electro-optic apparatus of claim 8, including a metal plate operatively connected to said first connection face and to said first electrode, and a metal plate operatively connected to said second connection face and to said second electrode.

10. The electro-optic apparatus of claim 8, including a metal layer operatively connected to said first connection face and to said first electrode, and a metal layer operatively connected to said second connection face and to said second electrode.

11. The electro-optic apparatus of claim 1, including a first electrode operatively connected to said first connection face, a second electrode operatively connected to said second connection face, and wherein said means for applying a voltage across said crystal utilizes a pulsed high voltage power supply operatively connected to said first electrode and said second electrode.

12. The electro-optic apparatus of claim 11, including a metal plate operatively connected to said first connection face and to said first electrode, and a metal plate operatively connected to said second connection face and to said second electrode.

13. The electro-optic apparatus of claim 11, including a metal layer operatively connected to said first connection face and to said first electrode, and a metal layer operatively connected to said second connection face and to said second electrode.

14. An electro-optic apparatus that will obtain a net phase retardation on the polarization of a laser beam for controlling the switching of the laser beam, comprising:
a yttrium calcium oxyborate (YCa4O(BO3)3 or YCOB) crystal with electro-optic characteristics for controlling the switching of the laser beam, said crystal having a first connection face and a second connection face,
said first connection face and said second connection face being generally parallel,
a first metal element/electrode operatively connected to said first connection face,
a second metal element/electrode operatively connected to said second connection face, and
means for applying a voltage across said yttrium calcium oxyborate (YCa4O(BO3)3 or YCOB) crystal utilizing said first metal element/electrode and said second metal element/electrode and said electro-optic characteristics to obtain a net phase retardation on polarization of said the laser beam when the laser beam is passed through said yttrium calcium oxyborate (YCa4O(BO3)3 or YCOB) crystal for controlling the switching of the laser beam.

15. The electro-optic apparatus of claim 14, wherein said means for applying a voltage across said yttrium calcium oxyborate (YCa4O(BO3)3 or YCOB) crystal utilizes a standard high-voltage power supply.

16. The electro-optic apparatus of claim 14, wherein said means for applying a voltage across said yttrium calcium oxyborate (YCa4O(BO3)3 or YCOB) crystal utilizes a pulsed high voltage power supply.

17. The electro-optic apparatus of claim 14, wherein said first metal element/electrode is a metal plate and said second metal element/electrode is a metal plate.

18. The electro-optic apparatus of claim 14, wherein said first metal element/electrode is a metal layer and said second metal element/electrode is a metal layer.

19. A method of producing an electro-optic apparatus that will obtain a net phase retardation on the polarization of a laser beam for controlling the switching of the laser beam, comprising the steps of:
providing a crystal with electro-optic characteristics for controlling the switching of the laser beam, said crystal composed of a compound having the chemical formula ReAe4O(BO3)3 where: RE consists of one or more of the following elements La, Ce, Pr, Nd, Sm, Eu, Gd, Tb, Dy, Ho, Er, Tm, Yb, Lu and two other elements Y and Sc; and where Ae is from the list of Ca, Sr, or Ba with a first connection face and a second connection face;
positioning said first connection face and said second connection face generally parallel;
placing said crystal with electro-optic characteristics in operative position relative to metal electrodes connected to said first connection face and said second connection face;
and
applying a voltage across said crystal thereby utilizing said electro-optic characteristics and obtaining a net phase retardation on the polarization of the laser beam when the laser beam is passed through said crystal for controlling the switching of the laser beam.

20. The method of producing an electro-optic apparatus that will obtain a net phase retardation on the polarization of a laser beam for controlling the switching of the laser beam of claim 19 wherein said two other elements Y and Sc behave similar to rare earths.

21. The method of producing an electro-optic apparatus that will obtain a net phase retardation on the polarization of a laser beam for controlling the switching of the laser beam of claim 19 wherein the sum of the partial substitution of the combination of said Ca, Sr, or Ba sums to 4.

22. The method of producing an electro-optic apparatus that will obtain a net phase retardation on the polarization of a laser beam for controlling the switching of the laser beam of claim 19 including the steps of operatively connecting a metal layer to said first connection face and to said first electrode, and operatively connecting a metal layer to said second connection face and to said second electrode.

23. The method of producing an electro-optic apparatus that will obtain a net phase retardation on the polarization of a laser beam for controlling the switching of the laser beam of claim 19 wherein said step of applying a voltage across said crystal comprises applying said voltage with standard high-voltage power supplies or pulsers.

* * * * *